US011316997B2

(12) United States Patent
Sugita et al.

(10) Patent No.: US 11,316,997 B2
(45) Date of Patent: Apr. 26, 2022

(54) IMAGE PROCESSING APPARATUS, CONTROL METHOD THEREOF, AND STORAGE MEDIUM

(71) Applicant: CANON KABUSHIKI KAISHA, Tokyo (JP)

(72) Inventors: Hikaru Sugita, Ibaraki (JP); Yoshihiro Tsukada, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/952,811

(22) Filed: Nov. 19, 2020

(65) Prior Publication Data
US 2021/0160393 A1    May 27, 2021

(30) Foreign Application Priority Data
Nov. 21, 2019  (JP) .............................. JP2019-210897

(51) Int. Cl.
*H04N 1/00* (2006.01)
*H04L 51/10* (2022.01)
*H04L 51/046* (2022.01)

(52) U.S. Cl.
CPC ....... *H04N 1/00811* (2013.01); *H04L 51/046* (2013.01); *H04L 51/10* (2013.01); *H04N 1/00217* (2013.01); *H04N 1/00384* (2013.01); *H04N 1/00472* (2013.01); *H04N 1/00822* (2013.01)

(58) Field of Classification Search
CPC ........... H04N 1/00811; H04N 1/00217; H04N 1/00822
See application file for complete search history.

(56) References Cited

U.S. PATENT DOCUMENTS

| 10,212,110 | B2* | 2/2019 | Lee | ................ | H04L 12/1827 |
| 2013/0021640 | A1* | 1/2013 | Tamura | ................ | H04N 1/4426 |
| | | | | | 358/1.14 |
| 2014/0063562 | A1* | 3/2014 | Lee | ................ | H04N 1/0023 |
| | | | | | 358/439 |
| 2016/0050326 | A1* | 2/2016 | Lee | ................ | H04N 1/00244 |
| | | | | | 358/402 |
| 2020/0099800 | A1* | 3/2020 | Noguchi | ............ | H04N 1/32662 |
| 2020/0344375 | A1* | 10/2020 | Ishii | ................ | G06F 3/1228 |

FOREIGN PATENT DOCUMENTS

JP        2017108341 A      6/2017

* cited by examiner

*Primary Examiner* — Benjamin O Dulaney
(74) *Attorney, Agent, or Firm* — Canon U.S.A., Inc. IP Division

(57) ABSTRACT

An image processing apparatus communicates with a chat server that controls displaying information indicating received image data on a talk room based on received information indicating the talk room of the chat server. The image processing apparatus includes a reading unit that reads an image of a document and generates image data based on the image, a receiving unit that receives information indicating the talk room of the chat server from a mobile terminal, and a transmission unit that transmits the generated image data and the information indicating the talk room to the chat server.

15 Claims, 14 Drawing Sheets

FIG.7A
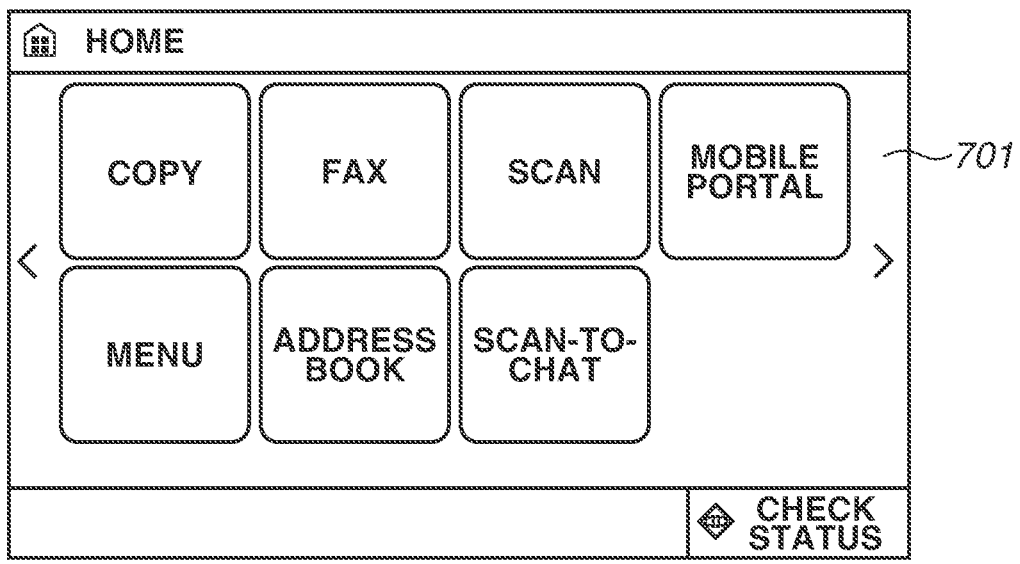
RECEIVE SETTING DATA FROM MOBILE TERMINAL
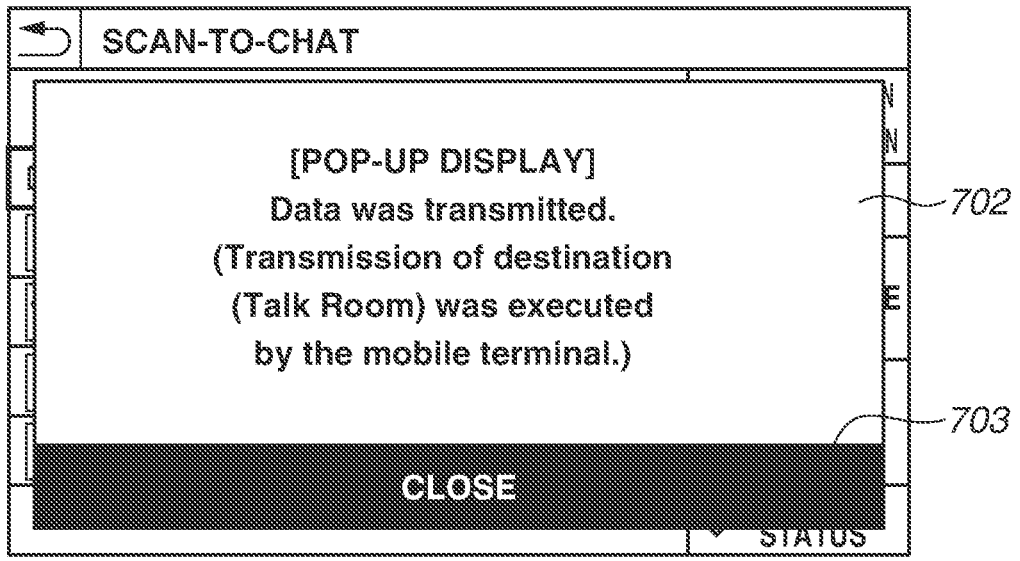
RECEIVE DESTINATION ADDRESS DATA AND SET DESTINATION TO SETTING SCREEN
FIG.7B

FIG.7C

714 — CHANNEL SELECTION (715 back arrow)

- ☐ CHANNEL 1 ▽
- ☐ CHANNEL 2 ▽
- ■ CHANNEL 3 △
  - ■ USER 1
  - ☐ USER 2
  - ☐ USER 3
- ◆ CHECK STATUS

CHANNEL SETTING ⇒

FIG.7B ↙

TRANSMISSION SETTING

712 — SCAN-TO-CHAT

| POSTING DESTINATION: CHANNEL1@USER2 | CHECK DESTINATION 1 DESTINATION |
|---|---|
| DESTINATION SETTING \| TRANSMISSION SETTING | ╱ RESET |
| READING SIZE: A4 | ◆ BLACK-AND-WHITE START |
| 717 — FILE FORMAT: PDF | |
| TITLE: TEST TRANSMISSION | ◆ COLOR START |
| COMMENT: THIS IS TEST TRANSMISSION. | |
| FILE NAME: HANDOUTS | ◆ CHECK STATUS |

IMAGE PROCESSING APPARATUS, CONTROL METHOD THEREOF, AND STORAGE MEDIUM

BACKGROUND

Field

The present disclosure relates to an image processing apparatus, a control method thereof, and a storage medium.

Description of the Related Art

Japanese Patent Application Laid-Open No. 2017-108341 discusses an image processing apparatus that receives a mail address as destination information specified by a mobile terminal from the mobile terminal and transmits image data generated by scanning an image to a destination described in the received destination information.

When a user uses a chat service through a mobile terminal to transmit image data generated by scanning an image through an image processing apparatus to a talk room of the chat service, the user would like to specify, through the mobile terminal, a talk room on which the generated image is to be displayed.

For example, an image processing apparatus discussed in Japanese Patent Application Laid-Open No. 2017-108341, which transmits image data generated by scanning an image to a destination described in a mail address received from a mobile terminal, cannot receive information specifying a talk room of a chat service from the mobile terminal. The user thereby cannot display the image data on a desired talk room.

SUMMARY

Aspects of the present disclosure are directed to a technique that enables a user to display image data generated by scanning an image on a talk room based on information indicating the talk room of a chat service received through a mobile terminal.

According to an aspect of the present disclosure, an image processing apparatus that communicates with a chat server configured to control displaying information indicating received image data on a talk room based on received information indicating the talk room of the chat server. The image processing apparatus includes a reading unit configured to read an image of a document and generate image data based on the image, a receiving unit configured to receive information indicating the talk room of the chat server from a mobile terminal, and a transmission unit configured to transmit the generated image data and the information indicating the talk room to the chat server.

Further features will become apparent from the following description of exemplary embodiments with reference to the attached drawings.

BRIEF DESCRIPTION OF THE DRAWINGS

FIGS. 7A, 7B, and 7C are diagrams illustrating an example of a flow of screens when setting data is received from the mobile terminal.

DESCRIPTION OF THE EMBODIMENTS

Hereinafter, an exemplary embodiment will be described with reference to the appended drawings. A configuration described in the following exemplary embodiment is merely an example and is not seen to be limiting.

Figure 1:
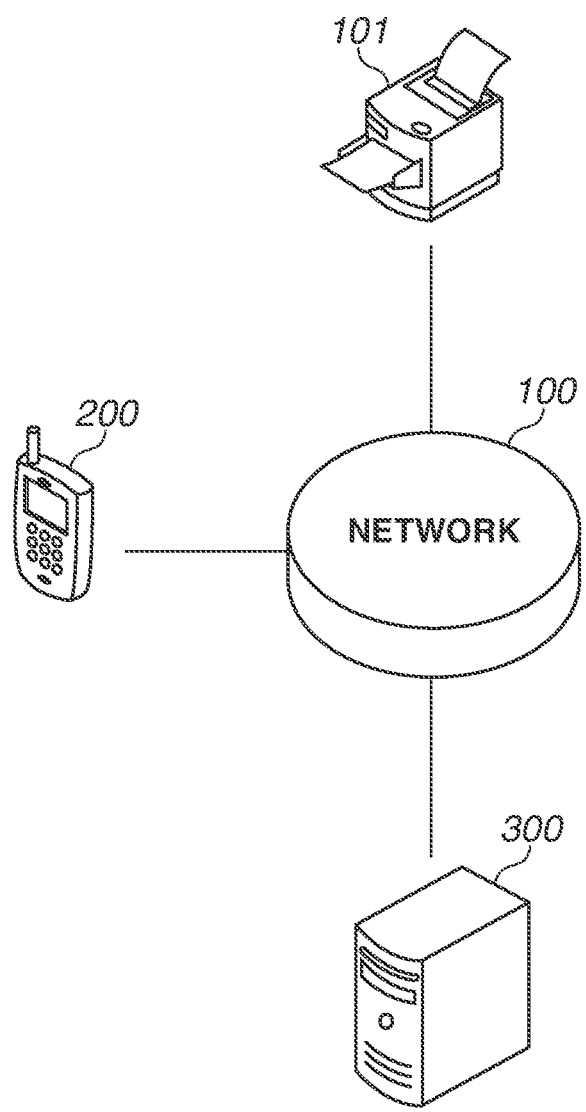
FIG. 1 illustrates an example of a system configuration.

FIG. 1 illustrates an example of a system configuration according to an exemplary embodiment of the present disclosure. A system of the present exemplary embodiment includes a mobile terminal 200, a multifunction peripheral (MFP) 101, and a message application server 300. The mobile terminal 200 is one example of a terminal apparatus. The multifunction peripheral (MFP) 101 is an image processing apparatus capable of executing communication via a network 100. The message application server 300 is configured to manage a chat service for receiving a message and image data transmitted from the MFP 101 and the mobile terminal 200 and displaying the message and the image data on the mobile terminal 200 and a personal computer (PC) (not illustrated) via a user operation. The network 100 according to the present exemplary embodiment can be the Internet or a local area network (LAN). The network 100 can also be a wired or wireless network.

Figure 2:
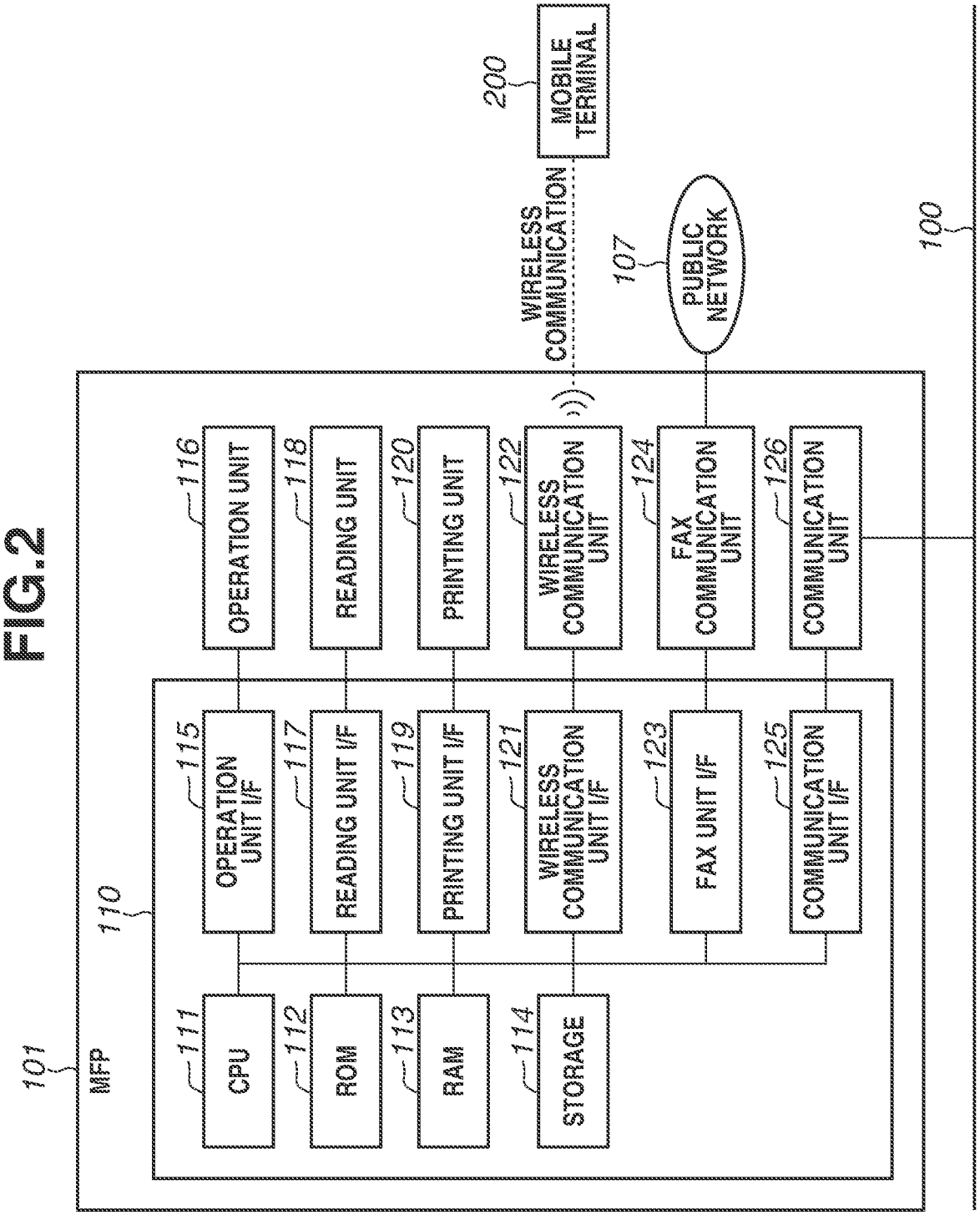
FIG. 2 is a block diagram illustrating an example of a hardware configuration of a multifunction peripheral (MFP).

FIG. 2 is a block diagram illustrating an example of a hardware configuration of the MFP 101. The MFP 101 includes a central processing unit (CPU) 111, a read only memory (ROM) 112, a random access memory (RAM) 113, a storage 114, an operation unit interface (I/F) 115, an operation unit 116, a reading unit I/F 117, a reading unit 118, a printing unit I/F 119, a printing unit 120, a wireless communication unit I/F 121, and a wireless communication unit 122. The MFP 101 also includes a FAX unit I/F 123, a FAX communication unit 124, a communication unit I/F 125, and a communication unit 126.

A control unit 110, which includes the CPU 111, controls overall operation of the MFP 101. The CPU 111 reads a control program stored in the ROM 112 or the storage 114, writes the control program in the RAM 113, and executes various types of control such as reading control and printing control. The ROM 112 stores a control program executable by the CPU 111. The ROM 112 also stores a boot program and font data. The RAM 113 is a main storage memory. The RAM 113 is used as a work area or a temporary storage area for loading various control programs stored in the ROM 112 and the storage 114. The storage 114 stores image data, print data, various programs, and various types of setting information. In the present exemplary embodiment, a flash memory is used for the storage 114. However, an auxiliary storage device, such as a solid-state drive (SSD) or a hard disk drive (HDD), can also be used as the storage 114. An embedded multimedia card (eMMC) can also be used for the storage 114.

In the MFP 101 of the present exemplary embodiment, one CPU 111 uses one memory (e.g., RAM 113) to execute various types of processing illustrated in the below-described flowcharts. However, the present exemplary embodiment is not limited thereto. For example, a plurality of CPUs, RAMs, ROMs, and storages can cooperatively execute respective pieces of processing illustrated in the below-described flowcharts. A part of the processing can also be executed by a hardware circuit, such as an application specific integrated circuit (ASIC) or a field programmable gate array (FPGA).

The operation unit I/F 115 connects the operation unit 116 to the control unit 110. The operation unit 116 includes a display unit, such as a touch panel, and hard keys. The operation unit 116 displays information to the user and detects an input from the user.

The reading unit I/F 117 connects the reading unit 118, such as a scanner, to the control unit 110. The reading unit 118 reads an image of a document, and the CPU 111 converts the read image into image data in binary data or other forms. Image data generated based on the image read by the reading unit 118 is transmitted to an external apparatus or printed on a recording sheet.

The printing unit I/F 119 connects the printing unit 120, such as a printer, to the control unit 110. The CPU 111 transfers image data (print data) stored in the RAM 113 to the printing unit 120 via the printing unit I/F 119. The printing unit 120 prints an image based on the transferred image data on a recording sheet fed from a sheet feeding cassette.

The wireless communication unit I/F 121 is configured to control the wireless communication unit 122 to wirelessly connect the control unit 110 to an external wireless apparatus (e.g., the mobile terminal 200).

The control unit 110 connects to a public network 107 by controlling the FAX communication unit 124, such as a facsimile, through the FAX unit I/F 123. The FAX unit I/F 123 is configured to control the FAX communication unit 124. The FAX unit I/F 123 controls a modem or a network control unit (NCU) used for facsimile communication, thereby enabling the control unit 110 to connect to the public network 107 or control facsimile communication protocol.

The communication unit I/F 125 connects the control unit 110 to the network 100. The communication unit I/F 125 enables the communication unit 126 to transmit image data and various types of internal information of the MFP 101 to an external apparatus connected to the network 100 and to receive print data and other information from an information processing apparatus connected to the network 100. Methods for executing transmission/reception via the network 100 include transmission/reception using an e-mail, and file transmission using the other protocols (e.g., File Transfer Protocol (FTP), Server Message Block (SMB), and Web-based Distributed Authoring and Versioning (WEBDAV)). Image data and various types of setting data can be transmitted to or received from the mobile terminal 200 and the message application server 300 accessed thereto through Hyper-Text Transfer Protocol (HTTP) communication via the network 100.

Figure 3:
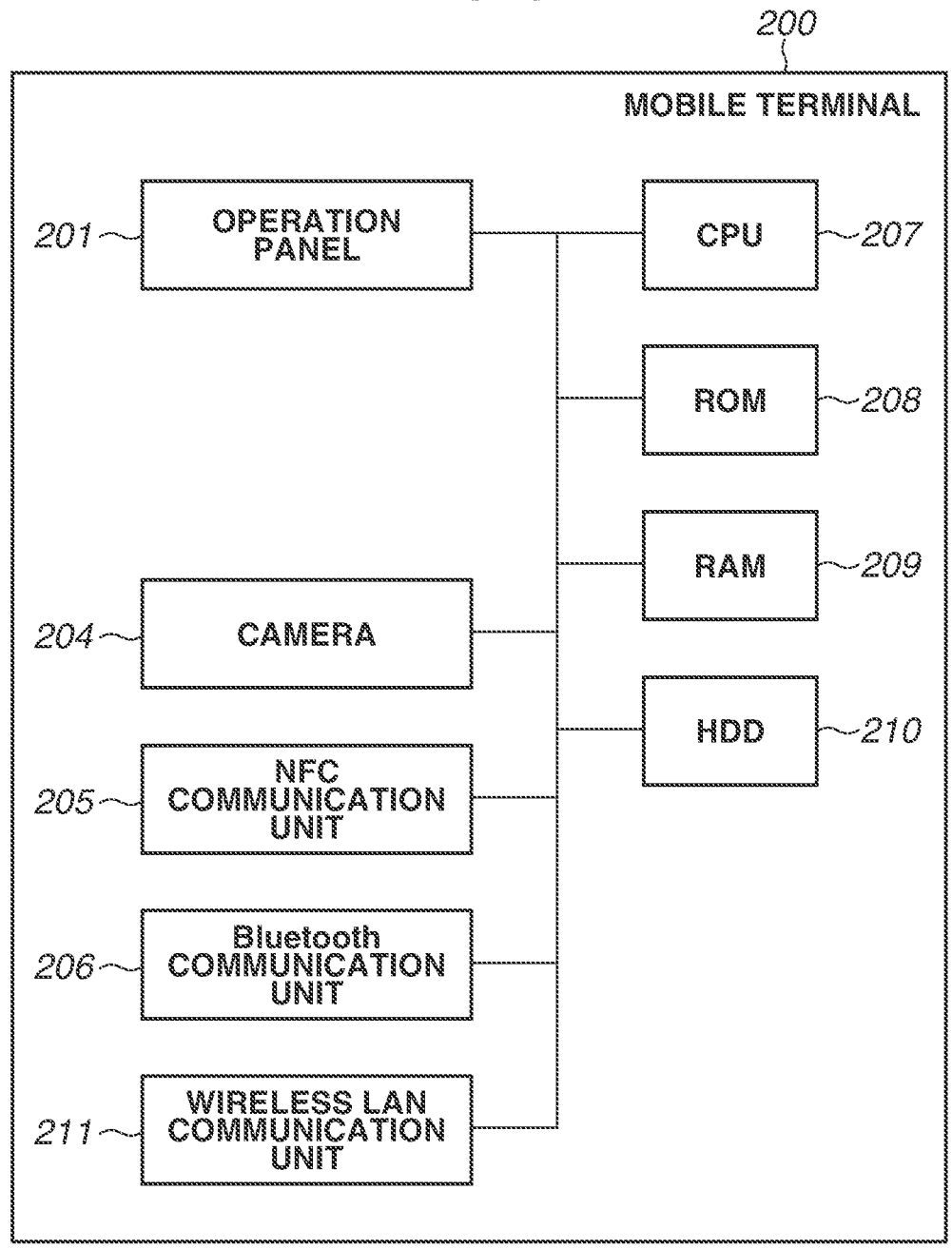
FIG. 3 is a block diagram illustrating an example of a hardware configuration of a mobile terminal.

FIG. 3 is a block diagram illustrating an example of a hardware configuration of the mobile terminal 200. In the present exemplary embodiment, the mobile terminal 200 is an apparatus, such as a smartphone or a tablet PC. However, the mobile terminal 200 can be any information processing apparatus capable of executing Wi-Fi® communication.

A CPU 207 reads a control program stored in the ROM 208 and executes various types of processing for controlling the operation of the mobile terminal 200. The ROM 208 stores a control program. A RAM 209 works as a temporary storage area such as a main memory or a work area of the CPU 207. An HDD 210 stores various types of data, such as photographs and electronic documents.

The operation panel 201 has a touch panel function for detecting a touch operation performed by a user and displays various screens provided by an operating system (OS) and an e-mail transmission application. The operation panel 201 is also used for checking the information stored in the message application server 300. The user can input a desired operation instruction to the mobile terminal 200 by performing touch operation on the operation panel 201. The mobile terminal 200 includes a hardware key (not illustrated) so that the user can input an operation instruction to the mobile terminal 200 via the hard key.

A camera 204 captures an image in response to an image-capturing instruction of the user. A photograph captured by the camera 204 is stored in a predetermined area in the HDD 210. The user can acquire information from a quick response code (QR Code®) read by the camera 204 by using a program that can analyze QR Codes®.

The mobile terminal 200 can transmit and receive data to/from various peripheral devices via a near field communication (NFC) unit 205, a Bluetooth® communication unit 206, and a wireless LAN communication unit 211. The Bluetooth® communication unit 206 of the mobile terminal 200 can be compliant with a standard of the Bluetooth® Low Energy.

Figure 4:
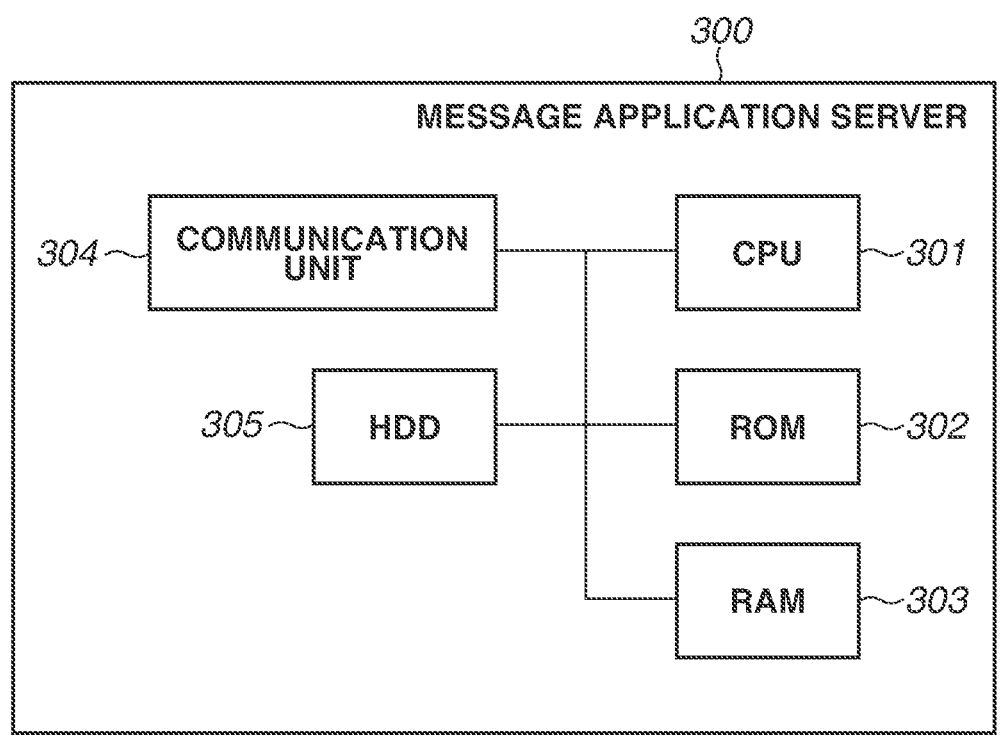
FIG. 4 is a block diagram illustrating an example of a hardware configuration of a message application server.

FIG. 4 is a block diagram illustrating an example of a hardware configuration of the message application server 300. A CPU 301 reads a control program stored in a ROM 302 and executes various types of processing for controlling the operation of the message application server 300. The ROM 302 stores a control program. A RAM 303 is used as a temporary storage area, such as a main memory or a work area of the CPU 301. An HDD 305 stores various types of data, such as messages, images, and channel information. The message application server 300 can transmit and receive data to/from various devices, such as the mobile terminal 200 and the MFP 101, via a communication unit 304. The communication unit 304 can execute wired communication using the Ethernet or can execute wireless communication, such as Wi-Fi® communication.

Figure 5:
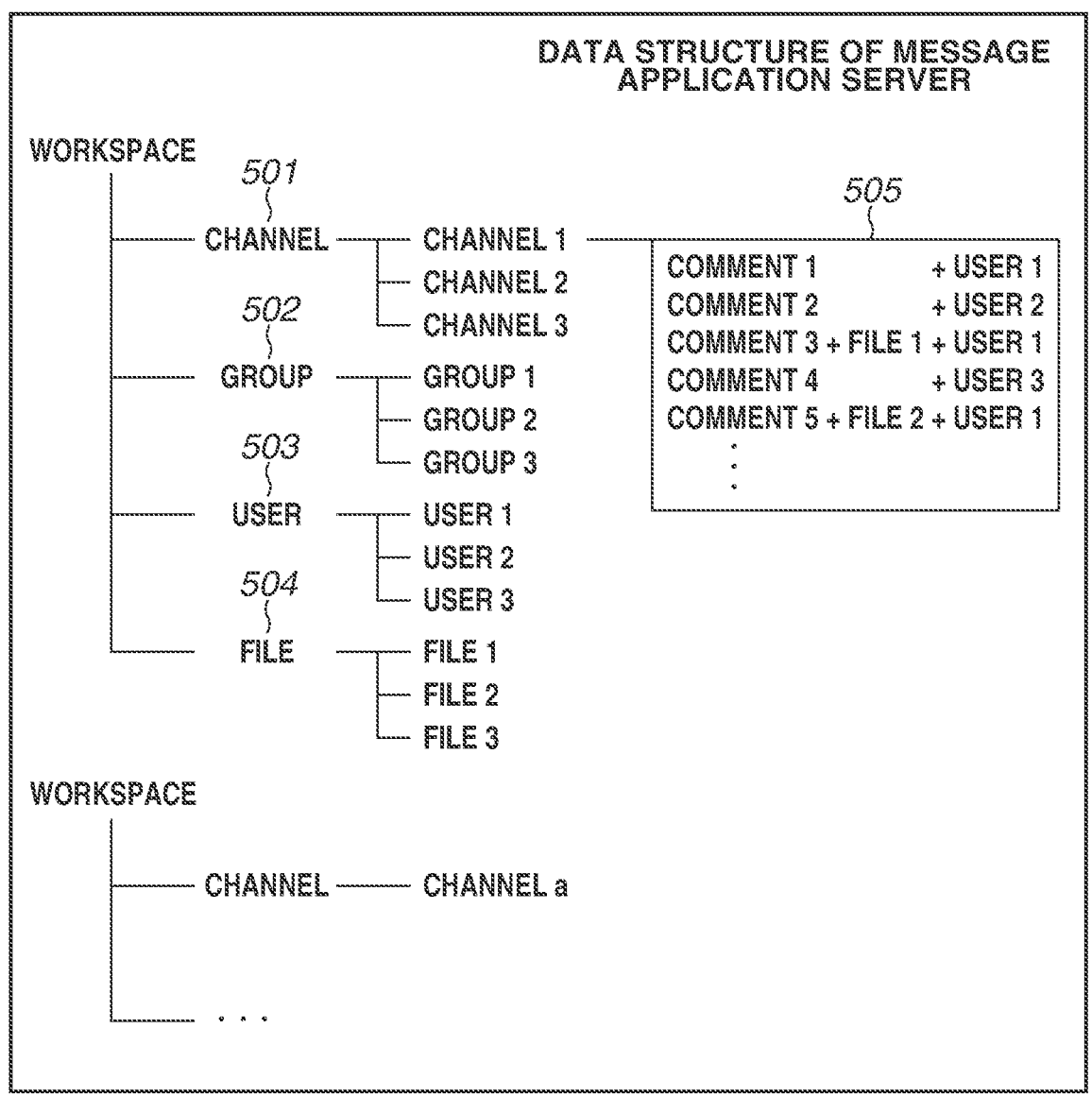
FIG. 5 is a diagram illustrating an example of a file structure within the message application server.
Figure 12:
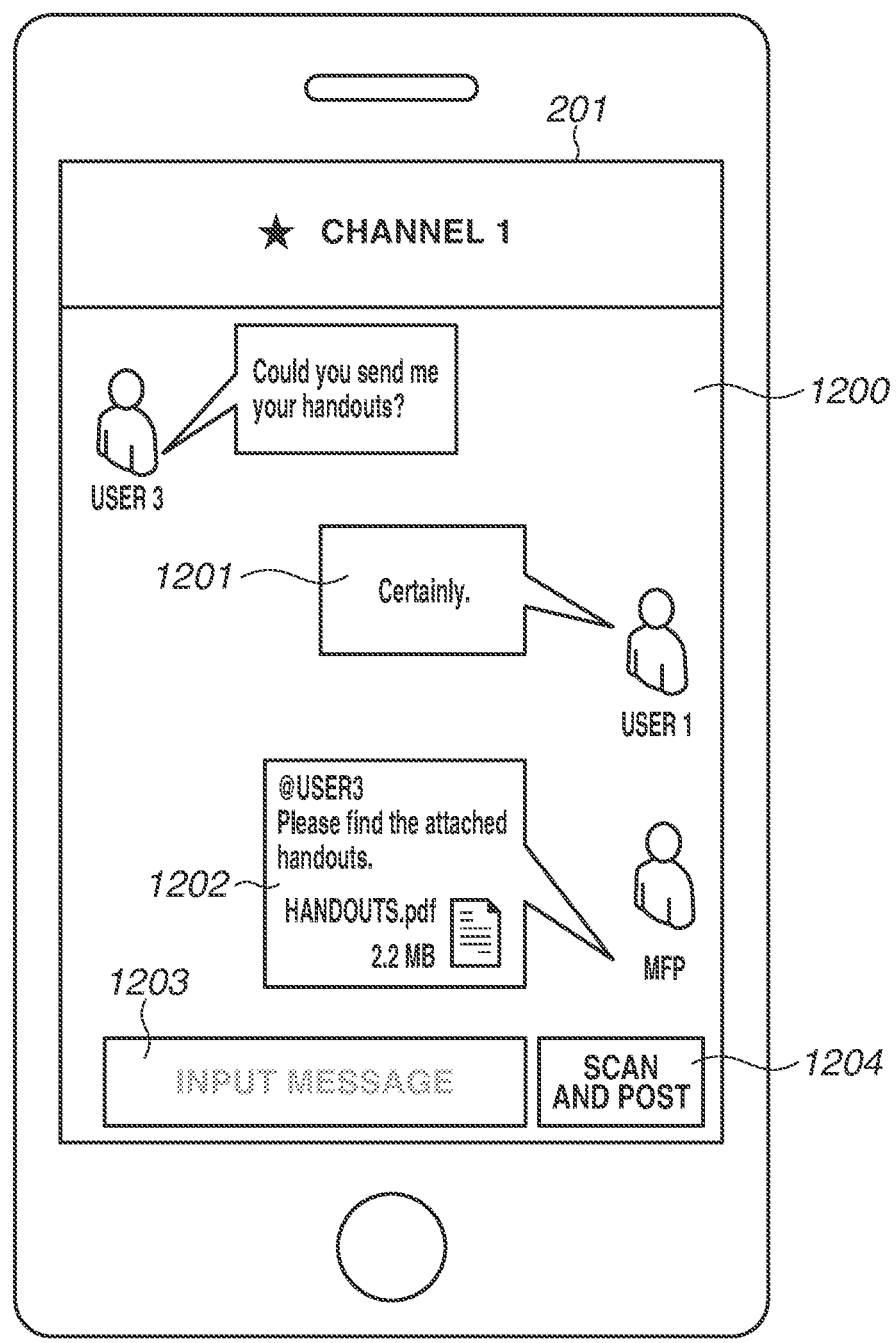
FIG. 12 is a diagram illustrating an example of a message screen of a message application.

FIG. 5 is a diagram illustrating an example of a file structure within the message application server 300. The file structure is stored in the HDD 305 of the message application server 300. A message screen 1200 illustrated in FIG. 12 is displayed based on this structure. The message application server 300 manages data with a large category called "workspace" and small categories, such as "channel", "group", "user", and "file" included in the workspace. A channel 501 is a chatroom where all members of the workspace can participate, and all information posted on the channel 501 is searchable by everyone. A group 502 is a channel used for holding a discussion disclosed to not all the members. One of the members needs to have an invitation to browse or participate in the group 502. A user 503 includes users participating in the workspace. An attached file is stored in a file 504. Content 505 exchanged in the channel, the group, or by the users is stored in association therewith. For example, a user participating in a channel 1 is stored in the channel 1 in association therewith. Messages and image data exchanged at the channel 1 are also stored in association therewith. Since the information is stored in the above-described state, a user associated with specified channel information can be displayed when a channel is selected from a channel selection screen (described below). A user who participates in that channel can thereby be displayed on the channel selection screen.

The workspace is similar to an organization within the message application to where a plurality of users belongs. The channel is similar to a chatroom within the workspace. The chatroom enables the users participating in the chatroom to mutually exchange messages as if they are conversing with each other. In the present exemplary embodiment, a channel is described as a chatroom. However, the present exemplary embodiment is not limited to the above, and any mechanism can be used as long as a plurality of users can exchange messages as if they are conversing with each other. For example, the channel can be a group-chat, a room, a talk-room, or a group.

Figure 6:
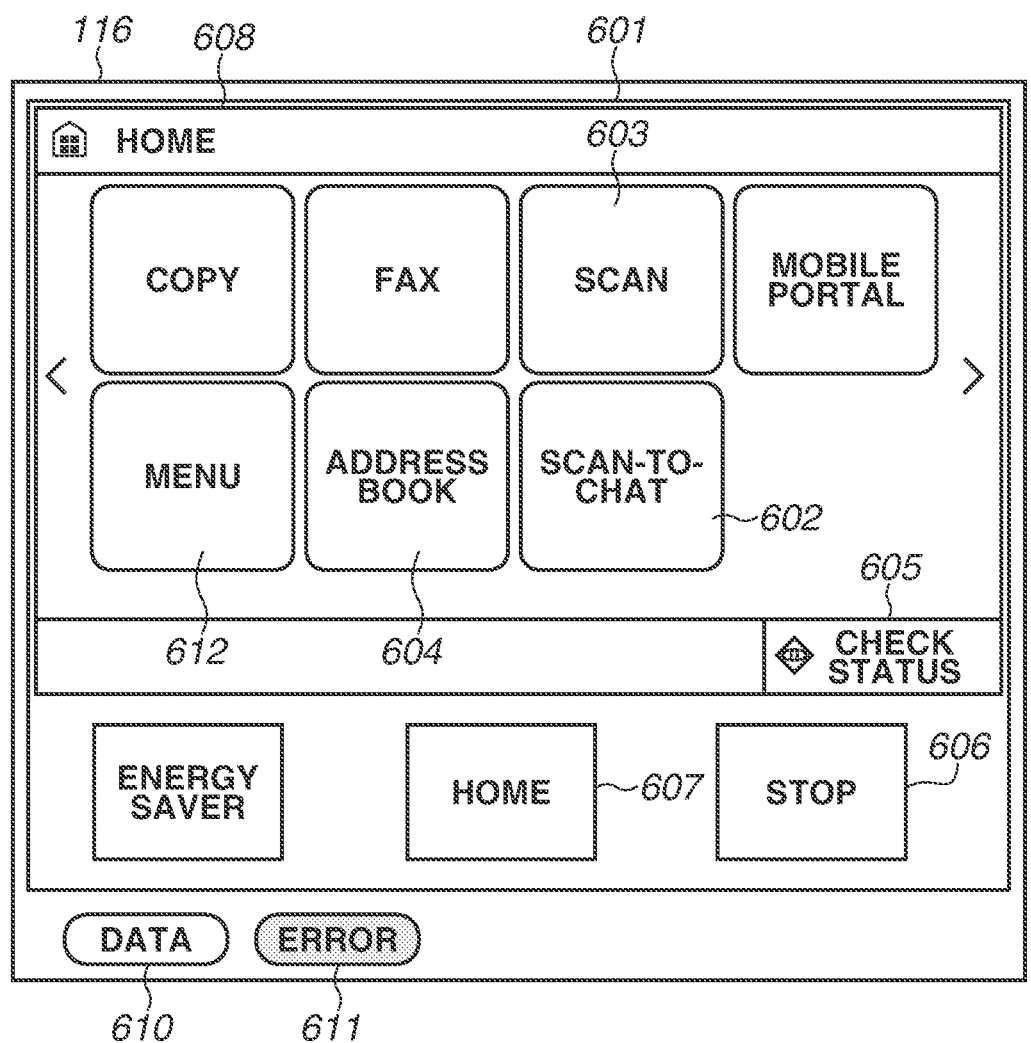
FIG. 6 is a diagram illustrating an example of a home screen displayed on an operation unit of the MFP.

FIG. 6 is a diagram illustrating an example of a home screen displayed on the operation unit 116 of the MFP 101. The operation unit 116 includes a touch panel 601 for displaying an operation screen and a light-emitting diodes (LEDs) 610 and 611. The touch panel 601 is an instruction unit. The touch panel 601 functions as an acceptance unit for accepting a user instruction and a display unit for displaying a screen. The user directly touches a screen displayed on the touch panel 601 with an object, such as a finger or a stylus, to input an execution instruction of a function displayed on the screen.

The touch panel 601 illustrated in FIG. 6 displays a home screen 608. The home screen 608 is an initial screen for inputting instructions for executing the functions provided by the MFP 101. Via the home screen 608, the user selects one of the functions the MFP 10 executes, and displays a screen for executing various settings with respect to the function. The functions include copying, fax, scanning, and media printing.

A check status button 605 is an object used for displaying a screen (status check screen) to check a status of the MFP 101. On the status check screen (not illustrated), a transmission history and a job execution history can be displayed.

Figure 7B:
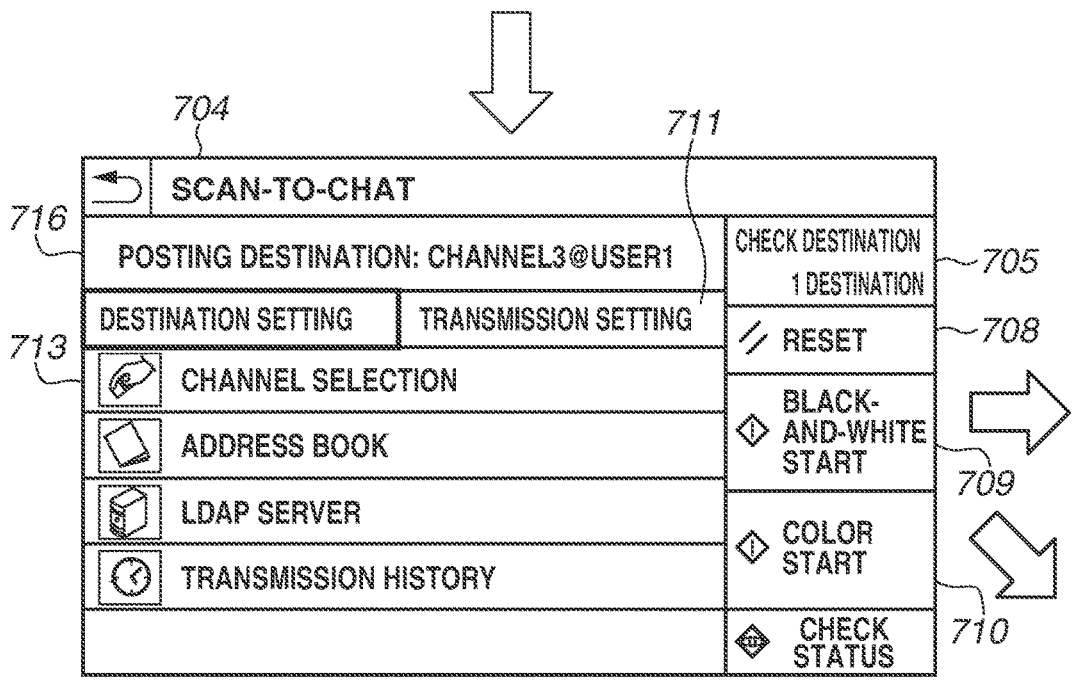
Figure 7B:
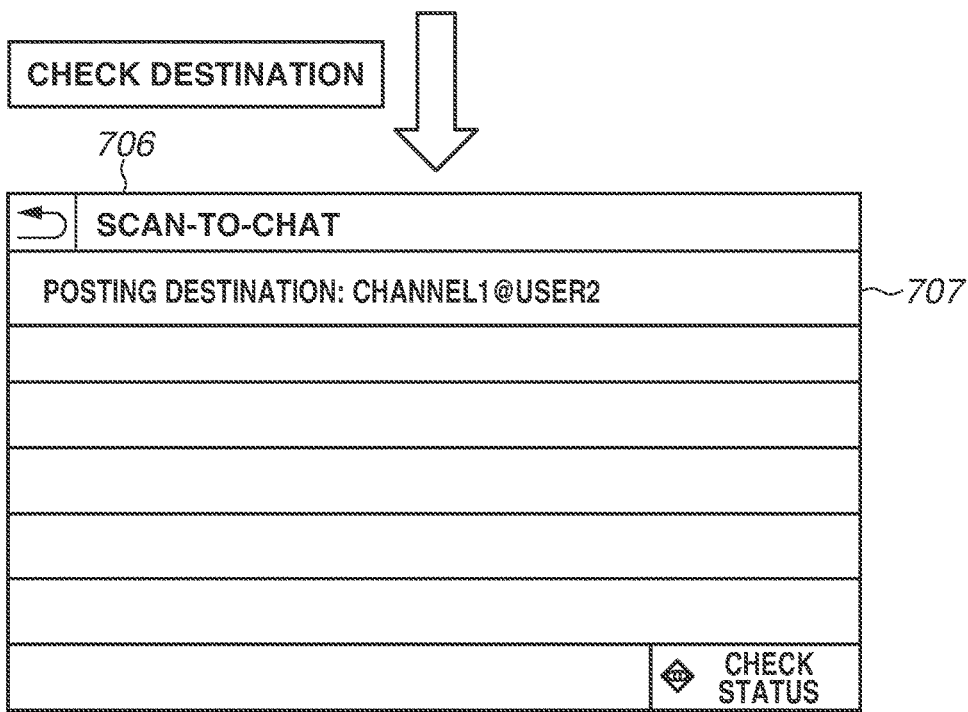

A scan-to-chat button 602 is an object used for displaying a setting screen of scan-to-chat processing. When the user selects the scan-to-chat button 602, a setting screen 704 in FIG. 7B is displayed on the operation unit 116. The scan-to-chat processing will be described below in detail with reference to FIG. 10.

A scan button 603 is an object used for displaying a scan selection screen (not illustrated) on the MFP 101. Via the scan selection screen, the user selects a transmission function, such as an e-mail transmission function, a file transmission function using SMB, FTP, or HTTP, and an internet fax (I-fax) transmission function. The user touches a displayed object representing the transmission function, so that a setting screen of that transmission function is displayed thereon.

An address book button 604 is an object which the user selects to display an address book screen 400 of the MFP 101. The LEDs 610 and 611 notify the user of a status of the MFP 101. The LED 610 is illuminated when an e-mail is received and a print job is received or executed. The LED 611 is illuminated when an error of some kind occurs in the MFP 101. A stop button 606 is an object always displayed on the operation unit 116. The user can cancel execution of various types of operation by selecting the stop button 606. A home button 607 is an object always displayed on the operation unit 116. The user can display the home screen 608 by selecting the home button 607. A menu button 612 is an object that the user selects to display a screen for executing environmental setting, such as language used and setting of each function.

Herein, when the user uses a chat service via a mobile terminal to display image data generated by scanning an image via an image processing apparatus on a talk room of the chat service, the user specifies a talk room on which the generated image data is to be displayed by operating the mobile terminal.

For example, an image processing apparatus discussed in Japanese Patent Application Laid-Open No. 2017-108341, which transmits image data generated by scanning an image to a destination indicated by a mail address received from a mobile terminal, does not receive information specifying a talk room of a chat service from the mobile terminal. The user therefore cannot display the image data on a desired talk room. To solve this issue, the present exemplary embodiment executes the following processing.

FIG. 12 is a diagram illustrating an example of a message screen of a message application. A message screen 1200 illustrated in FIG. 12 is displayed on the operation panel 201 of the mobile terminal 200 when the message application is started on the mobile terminal 200.

When the user starts the message application on the mobile terminal 200 and executes log-in by inputting an account ID and a password of the user, a screen exclusive for the user is displayed on the mobile terminal 200. In the example illustrated in FIG. 12, a user 1 is logged in, and a message 1201 of the user 1 is displayed.

A message 1202 is displayed (posted) when a user having an account of the user 1 transmits image data and posting parameters to the message application server 300. The image data is generated by scanning an image through the MFP 101. In the example illustrated in FIG. 12, from among the posting parameters, "channel 1" is specified as a posting destination channel, and "user 3" is specified as a user belonging to the channel 1. In addition, "handouts.pdf" is specified as a file name of the posting parameters, and "Please find the attached handouts." is specified as a comment. The user specifies the file name and the comment in a transmission setting screen 900 in FIG. 9 described below.

In the message screen 1200, a user name prefixed with a mark "@" is attached to a comment when the message is posted. This indicates that a posting target is a specific user belonging to the channel. In FIG. 12, via a terminal used for browsing the message application, the user 3 can thereby notice the posting earlier than other members belonging to the channel. In a case where the user 3 uses a smartphone as the mobile terminal 200 for browsing the message application, the user 3 is notified of the posting through an icon notification function, vibrations, or an incoming message alert. In a case where the user 3 uses a desktop terminal as the mobile terminal 200 for browsing the message application, the user 3 is notified of the posting through a desktop notification function. When the message screen 1200 is displayed, the message application server 300 searches the data structure in FIG. 5 for necessary information and displays the information. For example, the posted message 1202 corresponds to "Comment 3+File 1" included in the exchanged content 505. The message application server 300 acquires attribute information, such as a name of the file 1, from the file 504, and displays the attribute information on the message 1202 in a form of a file icon. The user can acquire the file 1 belonging to the file 504 by selecting the file icon. While the file posted on the channel is displayed in the form of the file icon, a preview image of the file can be displayed instead of the file icon.

An entry field 1203 is an object for accepting an input of a message from the user. When the entry field 1203 is selected, a software keyboard (not illustrated) is displayed. After the message is input, the input message is posted when an end-of-line button (not illustrated) is selected.

When a scan and post button 1204 is selected, image data generated by scanning an image via the MFP 101 is posted on a channel displayed when the scan and post button 1204 is selected. Specifically, when the scan and post button 1204 is selected, a scanning application previously installed in the mobile terminal 200 is started. The user then sets a posting destination and a reading setting via the scanning application, and transmits the setting information to the MFP 101. When the MFP 101 receives the above information, the MFP 101 executes scanning based on the received reading setting, and transmits information for requesting the message application server 300 to post the generated image data on a received posting destination to the message application server 300.

In the present exemplary embodiment, the message application and the scanning application are described as different applications. However, the message application and the scanning application can be provided as one application.

In a case where the scanning application is not installed in the mobile terminal 200 when the user selects the scan and post button 1204, the mobile terminal 200 can display a message prompting the user to install the scanning application, or can display a screen for installing the scanning application. In a case where the scanning application is not installed in the mobile terminal 200, the scan and post button 1204 can be hidden or displayed in a non-selectable state.

In the present exemplary embodiment, the transmission setting screen 900 is displayed when the scan and post button 1204 is selected from the message screen 1200, and setting data is transmitted to the MFP 101 when a transmit button 909 is selected from the transmission setting screen 900. However, the present exemplary embodiment is not limited thereto. The setting data can be transmitted to the MFP 101 from the mobile terminal 200 when the scan and post button 1204 is selected from the message screen 1200. At this time, the reading setting included in the setting data transmitted at this point of time is the reading setting previously set by the chat application. Channel information included in the transmitted setting data is channel information indicating a channel displayed when the scan and post button 1204 is selected.

Figure 9:
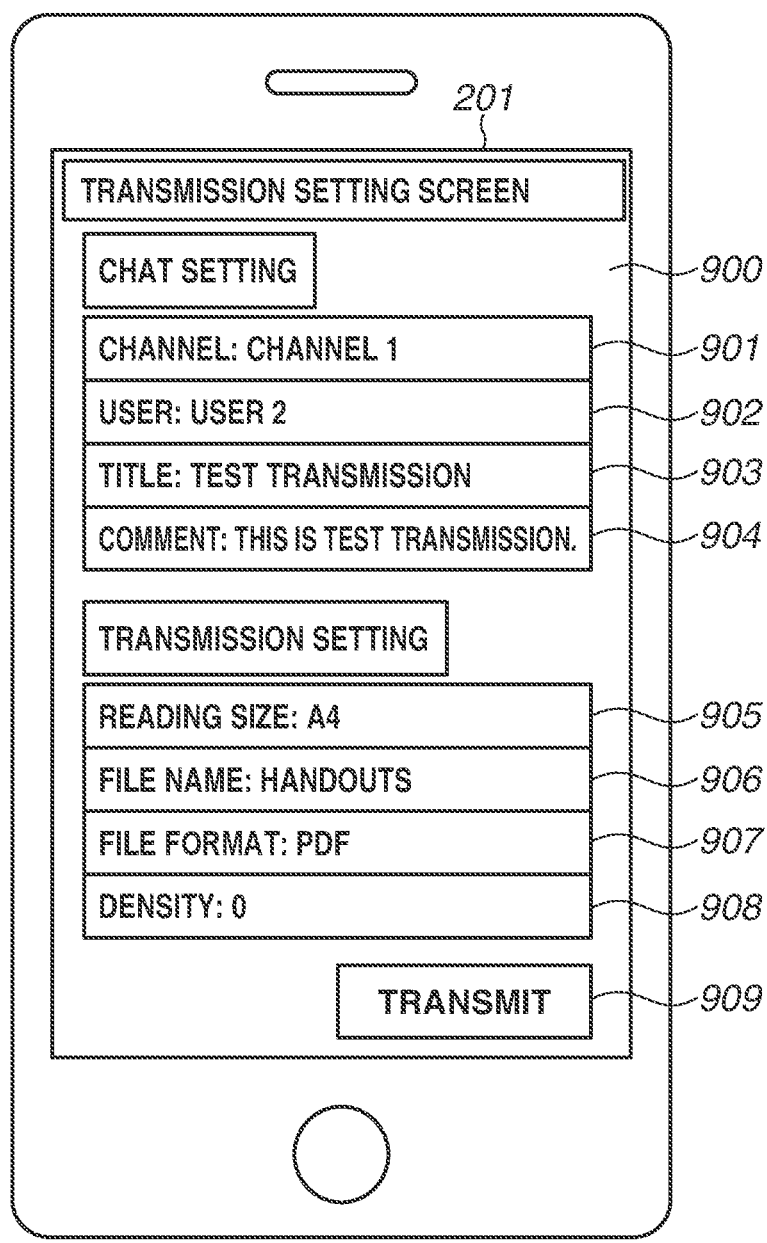
FIG. 9 is a diagram illustrating an example of a setting screen of a scanning application installed in the mobile terminal.

FIG. 9 is a diagram illustrating an example of a setting screen of a scanning application installed in the mobile terminal 200. A transmission setting screen 900 of the scanning application is displayed on the operation panel 201 of the mobile terminal 200. The transmission setting screen 900 illustrated in FIG. 9 is displayed when the user selects the scan and post button 1204 from the message screen 1200.

On the transmission setting screen 900, a channel button 901, a user button 902, a title button 903, and a comment button 904 are displayed as chat settings. On the transmission setting screen 900, a reading size button 905, a file name button 906, a file format button 907, and a density button 908 are also displayed as transmission (reading) settings. The transmit button 909 is also displayed on the screen.

On the channel button 901 of the transmission setting screen 900, an already set channel is displayed. When the user selects the scan and post button 1204 to display the transmission setting screen 900, a channel corresponding to a channel of a message screen displayed when the scan and post button 1204 is selected is automatically set. Since the message screen 1200 of the channel 1 is displayed as illustrated in FIG. 12, the channel 1 is set to the channel button 901 when the scan and post button 1204 is selected.

When the channel button 901 is selected, a channel list is displayed. Alternatively, the user can also set a channel by selecting a channel from the channel list. The channel list is displayed based on a channel list received from the message application. Specifically, when the user logged in the message application selects the scan and post button 1204, a list of channels to which the user belongs is transmitted to the scanning application, so that the scanning application displays the received channel list.

On the user button 902, an already set user is displayed. The user is not automatically set to the user button 902 even if the scan and post button 1204 is selected. Specifically, when the user button 902 is selected, a list of users belonging to the channel already set to the channel button 901 is displayed on the user button 902. The user who operates the mobile terminal 200 thereby sets a user by selecting the user from the list of users. The information about the user set in the above is used as a user to be mentioned as a destination user when image data is posted.

An already set title is displayed on a title button 903. When the title button 903 is selected, a software keyboard is displayed, and an input of a character string (title) is accepted.

An already set comment is displayed on a comment button 904. When the comment button 904 is selected, a software keyboard is displayed, and an input of a character string (comment) is accepted.

An already set size is displayed on a reading size button 905. A size selected from sizes (e.g., A3, A4, A5, B3, B4, and B5) displayed in a pull-down menu (not illustrated) is set as a reading size when the reading size button 905 is selected.

An already set file name is displayed on a file name button 906. When the file name button 906 is selected, a software keyboard is displayed, and an input of a character string (file name) is accepted. A file name accepted in the above is set as a file name of image data posted on the message application.

When a file format button 907 is selected, a file format selected from file formats, such as a portable document format (PDF) and a joint photographic experts group (JPEG) format, displayed in a pull-down menu (not illustrated) is set as a file format of image data to be generated.

When the user selects a density button 908, a software keyboard is displayed thereon, and a numerical value is input.

When the transmit button 909 is selected, setting data is transmitted to the MFP 101. The setting data includes the chat settings (e.g., channel information, user information, title information, and comment information), and the transmission settings (reading settings). An MFP as a transmission destination of the setting data is selected from a setting screen (not illustrated). Specifically, the setting screen is displayed on the operation panel 201 of the mobile terminal 200. On the setting screen, a list of MFPs existing near the mobile terminal 200 is displayed. The user selects an MFP as a transmission destination from the list. In the setting screen, an input of an internet protocol (IP) address of the MFP can be accepted in addition to displaying the list.

The user can also connect the mobile terminal 200 to the MFP via the NFC communication unit 205 of the mobile terminal 200 via near field communication (NFC) to receive connection information of the Wi-Fi®. The user can thereafter transmit the setting data via Wi-Fi® communication by establishing Wi-Fi® connection.

FIGS. 7A, 7B, and 7C, are diagrams illustrating an example of a flow of screens when setting data is received from the mobile terminal 200. Respective screens illustrated in FIGS. 7A, 7B, and 7C are displayed on the touch panel 601 of the operation unit 116 of the MFP 101.

A home screen 701 is a screen similar to the home screen 608 illustrated in FIG. 6. A pop-up screen 702 is displayed when the setting data is received from the mobile terminal 200 in a state where the home screen 701 is displayed. In this example, the pop-up screen 702 is displayed and superimposed on the setting screen 704. However, the entire screen can be shifted to another screen instead of displaying the pop-up screen 702. On the pop-up screen 702, a message indicating receipt of setting data from the mobile terminal 200 is displayed. When a close button 703 is selected, the pop-up screen 702 is closed, and the setting screen 704 is displayed.

On the setting screen 704, a check destination button 705 is displayed. On the check destination button 705, the number of destinations set as posting destinations of the image data generated by scanning an image is displayed. FIGS. 7A, 7B, and 7C illustrate an example of the setting screen displayed when the MFP 101 receives setting data including one channel information and one user information from the mobile terminal 200.

When the check destination button 705 is selected, a destination checking screen 706 is displayed. On the destination checking screen 706, the posting destinations corresponding to the number displayed on the check destination button 705 are displayed. In the example illustrated in FIGS. 7A, 7B, and 7C, the channel information and the user information included in the setting data received from the mobile terminal 200 are displayed as a posting destination "Channel1@User2".

When the user selects a posting destination button 707, the MFP 101 displays a detailed screen (not illustrated), which displays the details of the set posting destination.

When a reset button 708 is selected from the setting screen 704, the information set thereto is cleared. At this time, the set destination information is cleared. Communication between the MFP 101 and the mobile terminal 200 that transmits the setting data is also reset. Herein, a method of resetting the communication between the MFP 101 and the mobile terminal 200 will be described. The MFP 101 communicates with the mobile terminal 200 via the HTTP protocol, and manages a connection state with a session ID of the HTTP protocol. The session ID is an ID transmitted to the mobile terminal 200 via the communication protocol of the HTTP. The MFP 101 generates and transmits the session ID with respect to the logged-in mobile terminal 200, and saves the session ID in the RAM 113. The mobile terminal 200 connects to the MFP 101 by using the session ID received at the time of log-in. The MFP 101 determines whether a mobile terminal 200 connecting thereto is the logged-in mobile terminal 200 based on the received session ID and the saved session ID. The MFP 101 determines that the mobile terminal 200 is the same mobile terminal 200 if the session IDs conform to each other, and determines that the mobile terminal 200 is a different mobile terminal 200 if the session IDs do not conform to each other. When communication with the mobile terminal 200 is reset, the MFP 101 deletes the session ID stored in the RAM 113 and shifts to a state where the MFP 101 is not communicating with the mobile terminal 200. If the MFP 101 shifts to the above-described state, the MFP 101 can accept a new log-in request.

In a case where a black-and-white start button 709 or a color start button 710 is selected from the setting screen 704, the MFP 101 starts executing the processing for generating image data by scanning an image and transmitting the generated image data.

A transmission setting screen 712 is displayed when a transmission setting button 711 is selected. In the transmission setting screen 712, the user can change or check the transmission setting, such as a transmitting file setting 717. If the transmission setting information is included in the setting data received from the mobile terminal 200, the transmission setting screen 712, which reflects the received setting, is displayed.

A channel selection screen 714 is displayed when a channel selection button 713 is selected. A channel and a user are displayed on this channel selection screen 714 based on the channel information and the user information that the MFP 101 receives from the message application server 300 by using token information set by the user.

In the channel selection screen 714, the user can select a channel as a posting destination, and can select to whom the notification is to be transmitted from among the users belonging to the channel. In other words, the user can select a channel as a destination of the posting and a user to be mentioned. When a channel button is selected, users belonging to the channel are displayed in a pull-down menu. In the channel selection screen 714, the user can select both a channel and a user, or can select only a channel to post a message to all of users belonging to the channel. The user can select a plurality of channels, or can select one channel and a plurality of users belonging to the channel. The user can also select a plurality of channels and select a user belonging to each of the channels.

When a return button 715 is selected, content of the channel selection is retained, and the setting screen 704 is re-displayed. At this time, a posting address "Channel3@User1" is displayed on a posting destination column 716 in addition to the posting destination "Channel1@User3" indicated by the channel information and the user information previously received from the mobile terminal 200. The CPU 111 of the MFP 101 stores the posting destinations based on the channels and the users set as the above in the RAM 113 or the storage 114.

Figure 8:
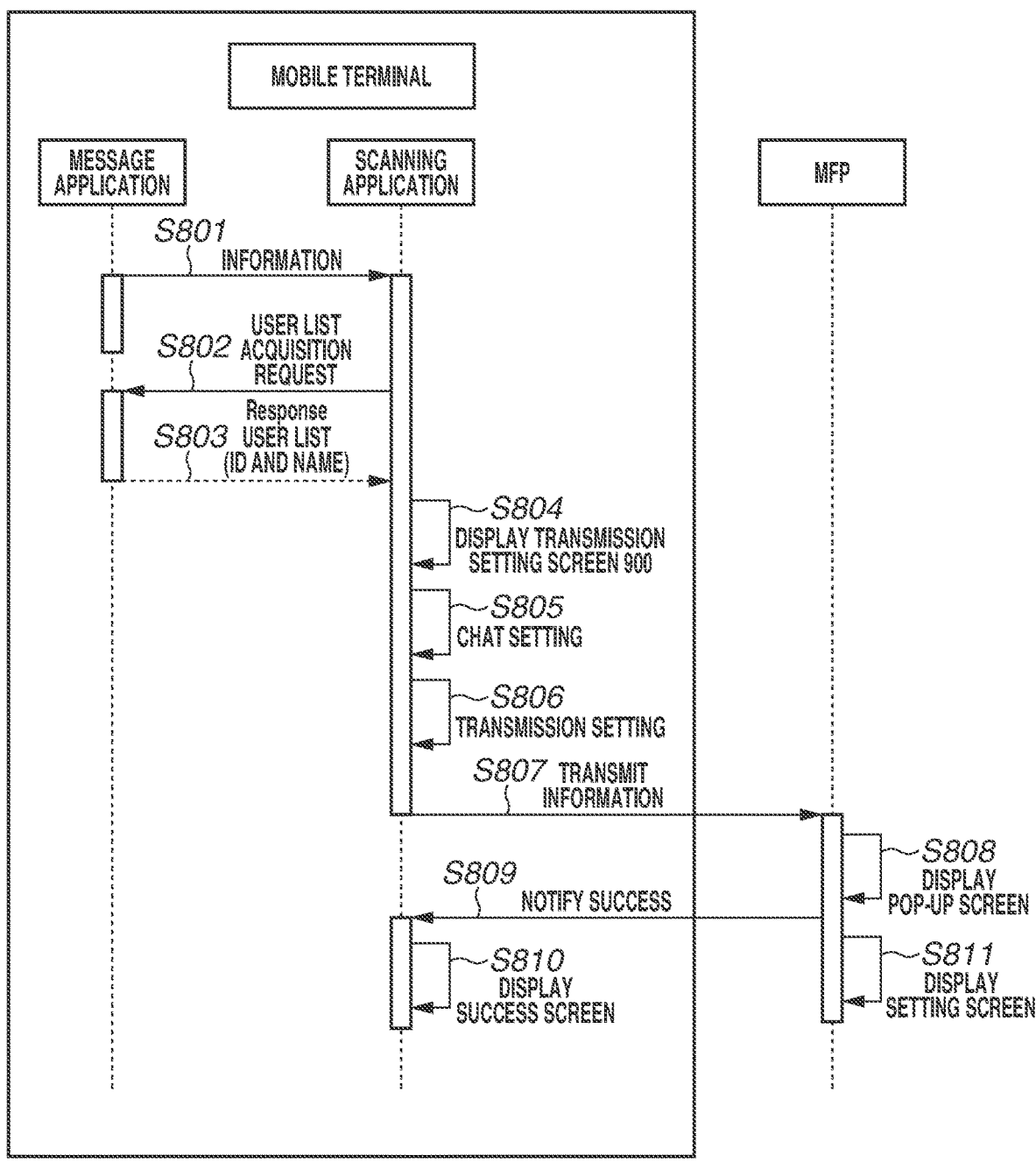
FIG. 8 is a diagram illustrating a processing sequence for transmitting setting data from the mobile terminal to the MFP.

FIG. 8 is a diagram illustrating an example of a processing sequence for transmitting setting data to the MFP 101 from the mobile terminal 200.

In step S801, the CPU 207 of the mobile terminal 200 executes the message application, and starts the scanning application when the scan and post button 1204 is selected from the message screen 1200 illustrated in FIG. 12. Token information, channel information, and channel information of the channel that is displayed when the scan and post button 1204 is selected are transmitted to the scanning application from the message application. The token information transmitted in step S801 is information associated with a bot application managed by the message application server 300. In the message application server 300, a bot application and a work space are stored in association with each other. The bot application and the work space can thereby be identified by specifying the token information. The channel information indicates all of channels within the work space corresponding to the token information.

In step S802, the CPU 207 of the mobile terminal 200 executes the scanning application to transmit information indicating an acquisition request of a list of users belonging to the channel indicated by the channel information received from the message application. Specifically, the CPU 207 transmits information for acquiring user information of users belonging to the channel indicated by the received channel information.

In step S803, the CPU 207 of the mobile terminal 200 executes the message application to transmit requested user information to the scanning application.

In step S804, the CPU 207 of the mobile terminal 200 executes the scanning application to display the transmission setting screen 900 illustrated in FIG. 9 on the operation panel 201 based on the received channel information and the user information.

In step S805, the CPU 207 of the mobile terminal 200 executes the scanning application, accepts user selections and user instructions via the transmission setting screen 900, and executes chat setting with respect to a user, a title, and a comment.

In step S806, the CPU 207 of the mobile terminal 200 executes the scanning application. The CPU 207 accepts user selections and user instructions via the transmission setting screen 900, and executes transmission setting with respect to a reading size, a file name, and a file format.

In step S807, the CPU 207 of the mobile terminal 200 executes the scanning application and transmits the setting content set in steps S805 and S806 to the MFP 101 as the setting data by accepting selection of the transmit button 909 input by the user.

In step S808, the CPU 111 of the MFP 101 displays a pop-up screen 702 on the touch panel 601 of the operation unit 116.

In step S809, the CPU 111 of the MFP 101 transmits information (notification of success) indicating success in receipt of the setting data to the mobile terminal 200. In the present exemplary embodiment, a notification of success is transmitted to the mobile terminal 200 after the pop-up screen 702 is displayed. However, the present exemplary embodiment is not limited thereto. For example, the notification of success can be transmitted to the mobile terminal 200 at the time when the MFP 101 receives the information, before the pop-up screen 702 is displayed.

In step S810, the CPU 207 of the mobile terminal 200 executes the scanning application and displays a screen indicating success in transmission of the setting data based on the received notification of success.

In step S811, when the close button 703 of the pop-up screen 702 is selected, the CPU 111 of the MFP 101 displays the setting screen 704 that reflects the received setting data on the touch panel 601 of the operation unit 116.

In the present exemplary embodiment, the MFP 101 displays the pop-up screen 702 when the setting data is received from the mobile terminal 200. However, the present exemplary embodiment is not limited thereto. For example, when the setting data is received from the mobile terminal 200, the MFP 101 can directly display the setting screen 704 without displaying the pop-up screen 702. At this time, the setting screen 704 that reflects the settings included in the received setting data is displayed.

Figure 10:
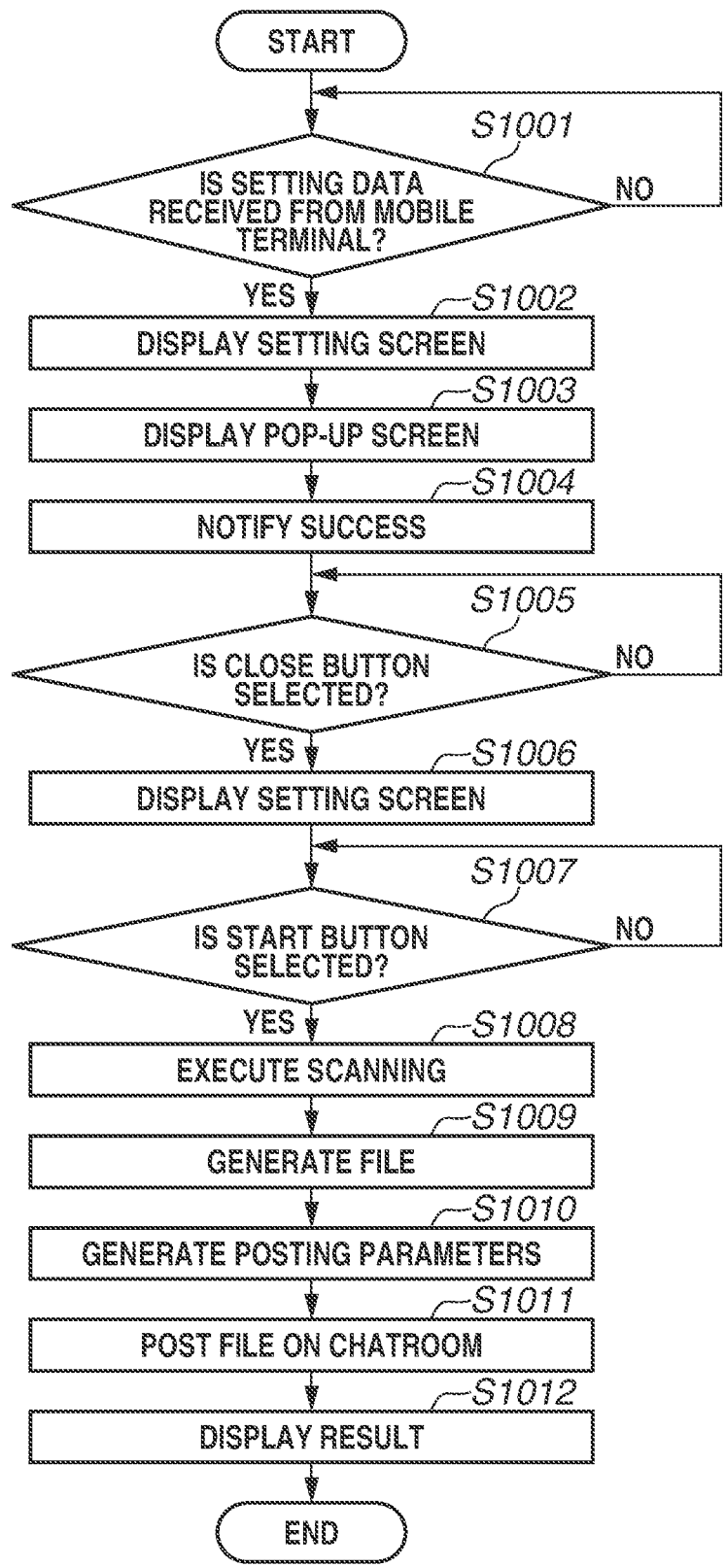
FIG. 10 is a flowchart illustrating an example of scan-to-chat processing executed by the MFP.

FIG. 10 is a flowchart illustrating an example of scan-to-chat processing executed by the MFP 101. The CPU 111 loads a program stored in the ROM 112 into the RAM 113 to execute the processing illustrated in the flowchart in FIG. 10. The processing flow in FIG. 10 is started when the MFP 101 acquires a user list by receiving token information from the mobile terminal 200.

In step S1001, the CPU 111 determines whether the setting data is received from the mobile terminal 200. If the CPU 111 determines that the setting data is received (YES in step S1001), the processing proceeds to step S1002. If the CPU 111 determines that the setting data is not received (NO in step S1001), the processing returns to step S1001, so that the CPU 111 repeatedly executes the processing.

In step S1002, the CPU 111 controls the operation unit 116 to display the setting screen 704 on the touch panel 601. The content of the received setting data is reflected on the setting screen 704 displayed in step S1002. Specifically, a posting destination based on the channel information and the user information is displayed on the posting destination column 716, if the received setting data includes one piece of channel information and one piece of user information. On the check destination button 705, "one destination" is displayed.

In step S1003, the CPU 111 controls the operation unit 116 to display the pop-up screen 702 immediately after displaying the setting screen 704.

In step S1004, the CPU 111 transmits information indicating success in receipt of the setting data to the mobile terminal 200.

In step S1005, the CPU 111 determines whether the close button 703 of the pop-up screen 702 is selected. If the CPU 111 determines that the close button 703 is selected (YES in step S1005), the processing proceeds to step S1006. If the CPU 111 determines that the close button 703 is not selected (NO in step S1005), the processing returns to step S1005, so that the CPU 111 repeatedly executes the processing.

In step S1006, the CPU 111 controls the operation unit 116 to re-display the setting screen 704 on the touch panel 601.

In step S1007, the CPU 111 determines whether the black-and-white start button 709 or the color start button 710 is selected from the setting screen 704. If the CPU 111 determines that the start button 709 or 710 is selected (YES in step S1007), the processing proceeds to step S1008. If the CPU 111 determines that the start button 709 or 710 is not selected (NO in step S1007), the processing returns to step S1007. If a button other than the black-and-white start button 709 or the color start button 710 displayed on the setting screen 704 is selected, the processing in the flow of screens illustrated in FIGS. 7A, 7B, and 7C is executed.

In step S1008, the CPU 111 controls the reading unit 118 to convey a document placed on a tray (not illustrated), read an image of the conveyed document, and generate image data.

In step S1009, the CPU 111 converts the image data generated in step S1008 to generate image data of a file format specified by the transmission setting included in the received setting data. In other words, the CPU 111 converts the image data into data of a file format set via the transmission setting screen 900 illustrated in FIG. 9. In the example illustrated in FIG. 9, a PDF file is generated.

In step S1010, the CPU 111 generates posting parameters. The posting parameters include a posting destination channel, a file format, a file name, and a posting comment. A file name corresponding to the file name set via the transmission setting screen 900 of FIG. 9 is set to the file name included in the posting parameters. The CPU 111 generates the posting comment included in the posting parameters by prefixing a mark "@" to the user information included in the received setting data.

In step S1011, the CPU 111 transmits the file and the posting parameters generated in steps S1009 and S1010 to the message application server 300 via the POST method of HTTP communication by using the token information received from the mobile terminal 200. The CPU 111 transmits the above-described data to the message application server 300 to control the message application server 300 to post the received file to the user who belongs to the channel specified by the posting parameter, the user being specified by the posting parameter. At this time, the message application server 300 to which the posting parameters are transmitted is specified by a URL input by the user via a setting screen (not illustrated).

In step S1012, the CPU 111 controls the operation unit 116 to receive a posting result from the message application server 300, and displays the posting result on the touch panel 601. According to the present exemplary embodiment, the user can easily post a file on a channel of the message application server 300 from the MFP 101.

Figure 11:
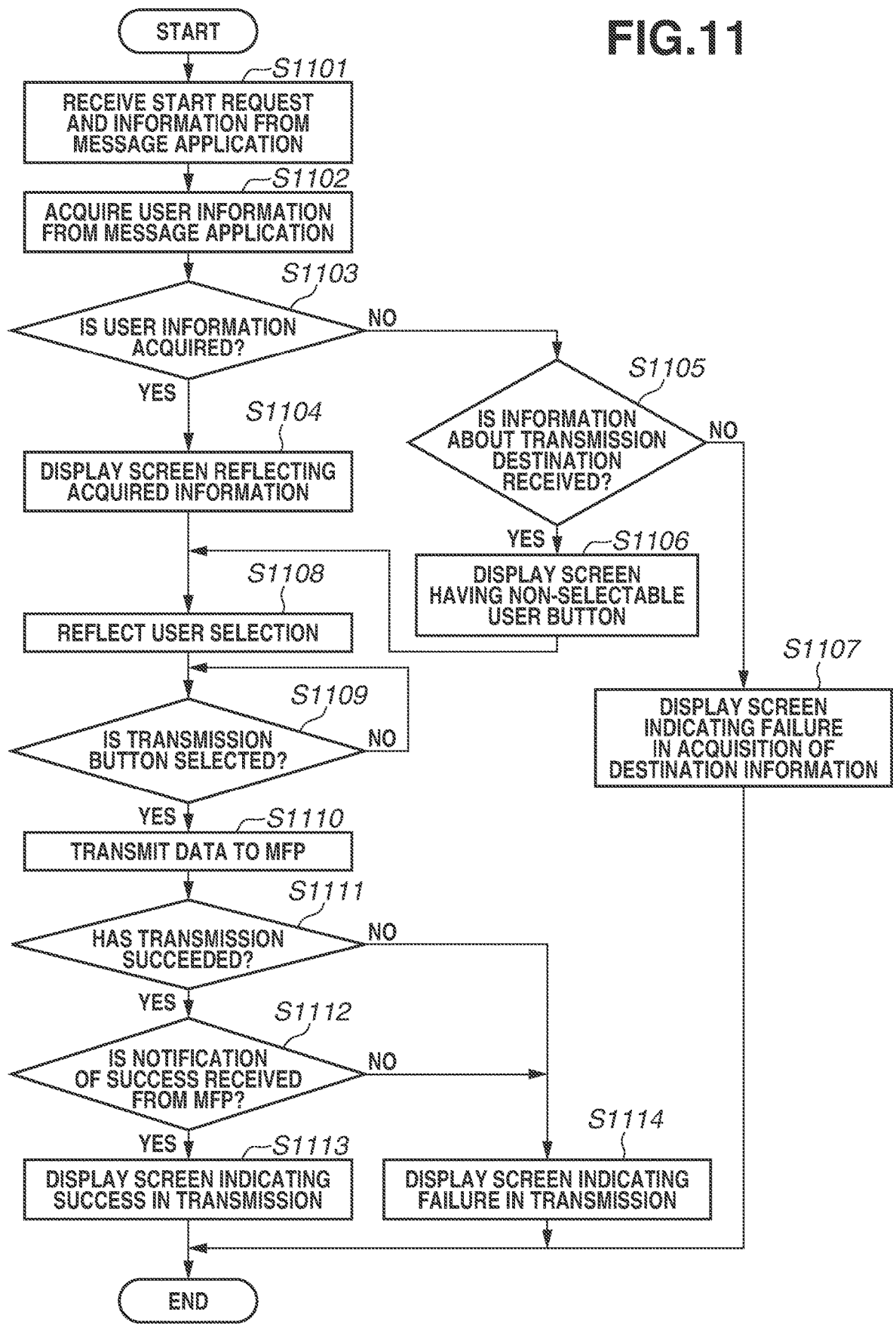
FIG. 11 is a flowchart illustrating an example of transmission processing of setting data executed by the mobile terminal.

FIG. 11 is a flowchart illustrating an example of setting data transmission processing executed by the mobile terminal 200. The CPU 207 loads a program stored in the ROM 208 into the RAM 209 and executes the program, thereby executing the processing illustrated in the flowchart in FIG. 11. The processing flow illustrated in FIG. 11 is started when the mobile terminal 200 executes the message application and accepts selection of the scan and post button 1204.

In step S1101, the CPU 207 executes the scanning application and receives a start request and information about a transmission destination from the message application. The received information about the transmission destination includes channel information, token information, and channel information of a channel that is displayed when the scan and post button 1204 is selected.

In step S1102, the CPU 207 executes the scanning application and acquires user information from the message application based on the received information about the transmission destination. For example, if the channel information is acquired in step S1101, the CPU 207 transmits a request for acquiring user information of a user belonging to a channel indicated by the channel information, and acquires the user information from the message application. If the channel information is not acquired, the CPU 207 transmits a request for acquiring user information of a user belonging to a work space corresponding to the token information. In the present exemplary embodiment, the user information is acquired separately from the channel information. However, the present exemplary embodiment is not limited thereto. For example, the CPU 207 can collectively acquire a start request, channel information, token information, channel information of a channel that is displayed when the scan and post button 1204 is selected, and user information.

In step S1103, the CPU 207 executes the scanning application and determines whether the user information has been acquired from the message application. If the CPU 207 determines that user information is acquired (YES in step S1103), the processing proceeds to step S1104. If the CPU 207 determines that user information is not acquired (NO in step S1103), the processing proceeds to step S1105.

In step S1104, the CPU 207 executes the scanning application and displays the transmission setting screen 900, which reflects the information acquired in steps S1101 and S1102. Specifically, a channel name of the channel that is displayed on the message screen 1200 when the scan and post button 1204 is selected is displayed on the channel button 901 of the transmission setting screen 900. When the channel button 901 is selected, the CPU 207 displays channel names of channels indicated by the received channel information (channel information of all of channels included in the work space) in a pull-down menu, and accepts a selection from the user. When the user button 902 is selected, the CPU 207 displays the users belonging to the channel selected by the channel button 901 or the channel previously set thereto, and accepts a selection. In a state where the channel name is not displayed on the channel button 901 i.e., the channel name is not set, the CPU 207 can display all of users included in the work space in a pull-down menu.

In step S1105, the CPU 207 executes the scanning application and determines whether the channel information has been received. If the CPU 207 determines that the channel information is received (YES in step S1105), the processing proceeds to step S1106. If the CPU 207 determines that the channel information is not received (NO in step S1105), the processing proceeds to step S1107.

In step S1106, the CPU 207 executes the scanning application and displays a transmission setting screen having the channel button 901 in a selectable state and the user button 902 in a non-selectable state. For example, the user button 902 is grayed-out in the transmission setting screen.

In step S1107, the CPU 207 executes the scanning application and displays a screen describing failure in acquisition of information (e.g., channel information) relating to the transmission destination, and ends the processing.

In step S1108, the CPU 207 executes the scanning application and accepts user inputs and user selections of various buttons 901 to 908 in the transmission setting screen 900, and executes chat setting and transmission setting.

In step S1109, the CPU 207 executes the scanning application and determines whether the transmit button 909 displayed on the transmission setting screen 900 has been selected. If the CPU 207 determines that the transmit button 909 is selected (YES in step S1109), the processing proceeds to step S1110. If the CPU 207 determines that the transmit button 909 is not selected (NO in step S1109), the processing returns to step S1109.

In step S1110, the CPU 207 executes the scanning application and transmits the set setting content to the MFP 101 as setting data.

In step S1111, the CPU 207 executes the scanning application and determines whether transmission of the setting data has succeeded. If the CPU 207 determines that transmission of the setting data has succeeded (YES in step S1111), the processing proceeds to step S1112. If the CPU 207 determines that transmission of the setting data has failed (NO in step S1111), the processing proceeds to step S1114.

In step S1112, the CPU 207 executes the scanning application and determines whether a notification of success has been received from the MFP 101. If the CPU 207 determines that the notification of success is received (YES in step S1112), the processing proceeds to step S1113. If the CPU 207 determines that the notification of success is not received (NO in step S1112), the processing proceeds to step S1114.

In step S1113, the CPU 207 executes the scanning application and displays a screen describing success in transmission on the operation panel 201.

In step S1114, the CPU 207 executes the scanning application and displays a screen describing failure in transmission on the operation panel 201.

By executing the above-described processing, image data generated by scanning an image can be displayed on a talk room based on the information indicating the talk room of the chat service received from a mobile terminal.

The MFP 101 according to the present exemplary embodiment displays the setting screen 704 when the setting data is received from the mobile terminal 200, and executes scanning and transmits generated image data to the message application server 300 when an execution instruction is received from the user. However, the present exemplary embodiment is not limited to the above. For example, when the MFP 101 receives the setting data from the mobile terminal 200, the MFP 101 can convey a document placed on a document tray, scan the image of the document to generate image data, and transmit the generated image data to the message application server 300 without accepting the user operation. In this case, a posting destination is determined based on the channel information and the user information received as the setting data set by the mobile terminal 200. The user can thereby execute scanning and transmission processing by simply operating the mobile terminal 200 without operating the operation unit 116 of the MFP 101, so that it is possible to save time and effort of the user.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2019-210897, filed Nov. 21, 2019, which is hereby incorporated by reference herein in its entirety.

What is claimed is:

1. An image processing apparatus:
a scanner that scans an image of a document and generates image data based on the image; and
a communicator that receives information indicating a channel of a chat service provided by a chat server from a mobile terminal,
wherein the communicator transmits the generated image data by the scanner and the received information indicating the channel to the chat server, and
wherein the transmitted image data is stored in association with the channel.

2. The image processing apparatus according to claim 1, further comprising a display that displays a setting screen including the received information indicating the channel.

3. The image processing apparatus according to claim 2, further comprising a controller that accepts an instruction,
wherein the scanner scans an image of the document and generates image data based on the image based on an execution instruction that is accepted in a state that the display displays the setting screen.

4. The image processing apparatus according to claim 3, wherein the controller sets information indicating a channel as a transmission destination.

5. The image processing apparatus according to claim 1, wherein the communicator transmits the generated image data by the scanner and the received information indicating the channel to the chat server so that the chat server posts the transmitted image data to the channel.

6. The image processing apparatus according to claim 1, wherein the communicator receives the information indicating the channel via wireless communication from the mobile terminal.

7. The image processing apparatus according to claim 1, wherein the scanner scans the image of the document and generates the image data based on the image based on reception of the information indicating the channel by the communicator.

8. The image processing apparatus according to claim 1,
wherein the communicator receives the information indicating the channel together with information indicating a scan setting, and
wherein the scanner scans the image of the document to generate the image data based on the scan setting.

9. The image processing apparatus according to claim 1, wherein the communicator receives the information indicating the channel together with information about a user included in the channel from the mobile terminal.

10. The image processing apparatus according to claim 1, wherein the image processing apparatus notifies the mobile terminal of information indicating success in receipt of the information indicating the channel.

11. The image processing apparatus according to claim 1, wherein the channel of the chat service is a chat room.

12. The image processing apparatus according to claim 1, wherein the mobile terminal is a smart phone.

13. The image processing apparatus according to claim 1, wherein the received information indicating the channel is information indicating a channel selected, from a plurality of channels of the chat service, by a user on a user interface of the mobile terminal.

14. An image processing method comprising:
scanning an image of a document and generating image data based on the image;
receiving information indicating a channel of a chat service provided by a chat server from a mobile terminal; and
transmitting the generated image data and the received information indicating the channel to the chat server,
wherein the transmitted image data is stored in association with the channel.

15. A non-transitory computer-readable storage medium storing a program that, when executed by a computer, causes the computer to perform an image processing method, the image processing method comprising:
- scanning an image of a document and generating image data based on the image;
- receiving information indicating a channel of a chat service provided by a chat server from a mobile terminal; and
- transmitting the generated image data and the received information indicating the channel to the chat server,
- wherein the transmitted image data is stored in association with the channel.

\* \* \* \* \*